United States Patent
He et al.

(10) Patent No.: US 11,966,683 B2
(45) Date of Patent: Apr. 23, 2024

(54) METHOD AND SYSTEM FOR COMPREHENSIVELY EVALUATING RELIABILITY OF MULTI-CHIP PARALLEL IGBT MODULE

(71) Applicant: WUHAN UNIVERSITY, Hubei (CN)

(72) Inventors: Yigang He, Hubei (CN); Chenyuan Wang, Hubei (CN); Lie Li, Hubei (CN); Bolun Du, Hubei (CN); Hui Zhang, Hubei (CN); Liulu He, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 339 days.

(21) Appl. No.: 17/503,396

(22) Filed: Oct. 18, 2021

(65) Prior Publication Data

US 2022/0215150 A1 Jul. 7, 2022

(30) Foreign Application Priority Data

Jan. 6, 2021 (CN) .......................... 202110012177.3

(51) Int. Cl.
*G06F 30/398* (2020.01)
*G06F 111/10* (2020.01)
*G06F 119/02* (2020.01)

(52) U.S. Cl.
CPC ........ *G06F 30/398* (2020.01); *G06F 2111/10* (2020.01); *G06F 2119/02* (2020.01)

(58) Field of Classification Search
CPC ..................................................... G06F 30/398
USPC ........................................................ 716/111
See application file for complete search history.

(56) References Cited

FOREIGN PATENT DOCUMENTS

CN 105242189 A * 1/2016

* cited by examiner

*Primary Examiner* — Eric D Lee
(74) *Attorney, Agent, or Firm* — JCIPRNET

(57) ABSTRACT

A method and a system for comprehensively evaluating reliability of a multi-chip parallel IGBT module are provided. The method includes: establishing a gate-emitter voltage reliability model of the multi-chip parallel IGBT module, performing a chip fatigue failure test, and selecting a gate-emitter voltage as a failure characteristic quantity; establishing a transconductance reliability model of the multi-chip parallel IGBT module, performing a bonding wire shedding failure test, and selecting a transmission characteristic curve of the module as a failure characteristic quantity; using a Pearson correlation coefficient to characterize a degree of health of the IGBT module, and respectively calculating degrees of health $PPMCC_C$ and $PPMCC_B$ in different degrees of chip fatigue and bonding wire shedding failure states; and comprehensively evaluating the reliability of the multi-chip parallel IGBT module according to $PPMCC_C$ and $PPMCC_B$.

15 Claims, 3 Drawing Sheets

---

Establish a gate-emitter voltage reliability model of the multi-chip parallel IGBT module, implement a chip fatigue failure test based on the gate-emitter voltage reliability model, and select a gate-emitter voltage as a failure characteristic quantity — S1

Establish a transconductance reliability model of the multi-chip parallel IGBT module, implement a bonding wire shedding failure test based on the transconductance reliability model, and select a transmission characteristic curve of the module as a failure characteristic quantity — S2

Define a degree of health of the IGBT module, use a Pearson correlation coefficient to characterize the degree of health, and calculate a degree of health $PPMCC_C$ in different degrees of chip fatigue failure states and a degree of health $PPMCC_B$ in different degrees of bonding wire shedding failure states — S3

Comprehensively evaluate the reliability of the multi-chip parallel IGBT module according to $PPMCC_C$ and $PPMCC_B$ — S4

METHOD AND SYSTEM FOR COMPREHENSIVELY EVALUATING RELIABILITY OF MULTI-CHIP PARALLEL IGBT MODULE

CROSS-REFERENCE TO RELATED APPLICATION

This application claims the priority benefit of China application serial no. 202110012177.3, filed on Jan. 6, 2021. The entirety of the above-mentioned patent application is hereby incorporated by reference herein and made a part of this specification.

BACKGROUND

Technical Field

The disclosure relates to the technical field of reliability of key power electronic components, and more specifically relates to a method and a system for comprehensively evaluating reliability of a multi-chip parallel insulated gate bipolar transistor (IGBT) module.

Description of Related Art

The IGBT module is a power electronic integrated module composed of multiple IGBT chips, diode chips, solder layers, bonding wires, ceramic copper clad substrates, heat dissipation baseplates, and power terminals. IGBT module is mainly applied to the fields of inverter, frequency converter, uninterruptible power supply, wind power, solar energy generation, etc., and is a core component of the power converter and also one of the components with the highest invalidity rate in the power converter. As the key core component in the high-power converter, the reliability of the IGBT module is an important issue in power electronic applications. In order to reduce the failure rate of the power converter and improve the reliability of the power converter, it is of great significance to evaluate the reliability of the IGBT module.

Since the coefficient of thermal expansion (CTE) of each layer in the semiconductor device is inconsistent, the fluctuation of the junction temperature causes the degree of expansion of each layer to be different, such that thermal stress is generated between the layers, resulting in fatigue of the solder layer or shedding of the bonding wire. Fatigue invalidity of the solder layer of the chip and shedding of the bonding wire are the main aging invalidity mechanisms of the IGBT module. At present, most researches on the reliability of the IGBT module focus on health-sensitive parameters and select electrical parameters of the module as failure features. However, most of the researches can only monitor one failure state at present and cannot monitor the chip failure and the bonding wire failure at the same time. Therefore, it is difficult to use a single health-sensitive parameter to accurately monitor the health state of the IGBT module and comprehensively evaluate the reliability of the IGBT module.

SUMMARY

In view of the above defects or improvement requirements of the prior art, the disclosure proposes a method and a system for comprehensively evaluating reliability of a multi-chip parallel IGBT module, which can accurately evaluate the health state and the reliability of the module regarding the chip fatigue failure and the bonding wire shedding failure in the IGBT module and are easy to operate.

In order to achieve the above objective, according to one aspect of the disclosure, a method for comprehensively evaluating reliability of a multi-chip parallel IGBT module is provided, which includes the following steps.

In Step (1), a gate-emitter voltage reliability model of the multi-chip parallel IGBT module is established, a chip fatigue failure test is implemented based on the gate-emitter voltage reliability model, and a gate-emitter voltage is selected as a failure characteristic quantity.

In Step (2), a transconductance reliability model of the multi-chip parallel IGBT module is established, a bonding wire shedding failure test is implemented based on the transconductance reliability model, and a transmission characteristic curve of the module is selected as a failure characteristic quantity.

In Step (3), a degree of health of the IGBT module is defined, a Pearson correlation coefficient is used to characterize the degree of health, and a degree of health $PPMCC_C$ in different degrees of chip fatigue failure states and a degree of health $PPMCC_B$ in different degrees of bonding wire shedding failure states are calculated.

In Step (4), the reliability of the multi-chip parallel IGBT module is comprehensively evaluated according to $PPMCC_C$ and $PPMCC_B$.

In some optional implementations, specific implementation of Step (3) is as follows.

In Step (3.1), the degree of health is adopted to characterize the reliability of the IGBT module. When the module has no chip fatigue failure and no bonding wire shedding failure, the degree of health is maximum. When the IGBT module is in a healthy initial state without chip fatigue failure, a gate-emitter voltage eigenvector is $\vec{x}$. When i chips fail in the IGBT module, a gate-emitter voltage eigenvector is $\vec{y}_i$. When the IGBT module is in the healthy initial state without bonding wire shedding failure, a transmission characteristic curve eigenvector of the IGBT module is $\vec{m}$. When p bonding wires shed in the IGBT module, a transmission characteristic curve eigenvector of the IGBT module is $n_p$.

(3.2) The linear correlation $PPMCC_C$ between the gate-emitter voltage in a chip fatigue failure state and a healthy state is obtained based on the gate-emitter voltage eigenvector $\vec{x}$ and the gate-emitter voltage eigenvector $\vec{y}_i$. The greater the $PPMCC_C$, the higher the correlation between the two, the higher the degree of health of chips, and the stronger the reliability.

(3.3) The linear correlation $PPMCC_B$ between the transmission characteristic curve in a bonding wire shedding failure state and the healthy state is obtained based on the transmission characteristic curve eigenvector $\vec{m}$ of the IGBT module and the transmission characteristic curve eigenvector $n_p$ of the IGBT module. The greater the $PPMCC_B$, the greater the correlation between the two, the higher the degree of health of bonding wires, and the higher the reliability of the module.

In some alternative embodiments, the linear correlation between the gate-emitter voltage in the chip fatigue failure state and the healthy state is obtained from $$PPMCC_C = r(\vec{x}, \vec{y_i}) = \frac{\sum_{j=1}^{h}(x_j - \bar{x})(y_{ij} - \bar{y_i})}{\sqrt{\sum_{j=1}^{h}(x_j - \bar{x})^2}\sqrt{\sum_{j=1}^{h}(y_{ij} - \bar{y_i})^2}},$$

where h represents a number of selected samples, $x_j$ represents an observed value of a point j corresponding to the gate-emitter voltage eigenvector x without chip failure, $\bar{x}$ represents a mean of observed values of the eigenvector $\vec{x}$, $y_{ij}$ represents an observed value of the point j corresponding to the gate-emitter voltage eigenvector $\vec{y}_i$ when i chips fail, and $\bar{y}_i$ represents a mean of observed values of the eigenvector $\vec{y}_i$.

In some alternative embodiments, the linear correlation between the transmission characteristic curve in the bonding wire shedding failure state and the healthy state is obtained from $$PPMCC_B = r(\vec{m}, \vec{n_p}) = \frac{\sum_{q=1}^{l}(m_q - \bar{m})(n_{pq} - \bar{n_p})}{\sqrt{\sum_{q=1}^{l}(m_p - \bar{m})^2}\sqrt{\sum_{q=1}^{l}(n_{pq} - \bar{n_p})^2}},$$

where l represents a number of selected samples, $m_q$ represents an observed value of a point q corresponding to the transmission characteristic curve eigenvector $\vec{m}$ of the module without bonding wire shedding, $\bar{m}$ represents a mean of observed values of the eigenvector $\vec{m}$, $n_{pq}$ represents an observed value of the point q corresponding to the transmission characteristic curve eigenvector $\vec{n}_p$ of the module when p bonding wires shed, and $\bar{n}_p$ represents a mean of observed values of the eigenvector $\vec{n}_p$.

In some optional implementations, specific implementation method of Step (4) is as follows.

A weighted summation is performed on the linear correlation $PPMCC_C$ between the gate-emitter voltage in the chip fatigue failure state and the healthy state and the linear correlation $PPMCC_B$ between the transmission characteristic curve in the bonding wire shedding failure state and the healthy state to obtain an overall degree of health of the module, and the reliability of the multi-chip parallel IGBT module is evaluated from the overall degree of health of the module. The overall degree of health of the module reflects the overall degree of health of the module in terms of a chip health state of the module and a bonding wire health state of the module.

In some optional implementations, the overall degree of health of the module is obtained from $PPMCC_H = a*PPMCC_C + b*PPMCC_B$, where a represents a proportion of failures caused by the chip fatigue failure in the IGBT module, and b represents a proportion of failures caused by the bonding wire shedding failure in the IGBT module.

According to another aspect of the disclosure, a system for comprehensively evaluating reliability of a multi-chip parallel IGBT module is provided, which includes the following.

A first failure characteristic quantity acquisition module is used to establish a gate-emitter voltage reliability model of the multi-chip parallel IGBT module, implement a chip fatigue failure test based on the gate-emitter voltage reliability model, and select a gate-emitter voltage as a failure characteristic quantity.

A second failure characteristic quantity acquisition module is used to establish a transconductance reliability model of the multi-chip parallel IGBT module, implement a bonding wire shedding failure test based on the transconductance reliability model, and select a transmission characteristic curve of the module as a failure characteristic quantity.

A health degree calculation module is used to define a degree of health of the IGBT module, use a Pearson correlation coefficient to characterize the degree of health, and calculate a degree of health $PPMCC_C$ in different degrees of chip fatigue failure states and a degree of health $PPMCC_B$ in different degrees of bonding wire shedding failure states.

A reliability evaluation module is used to comprehensively evaluate the reliability of the multi-chip parallel IGBT module according to $PPMCC_C$ and $PPMCC_B$.

In some optional implementations, the health degree calculation module includes the following.

A health parameter definition module is used to adopt the degree of health to characterize the reliability of the IGBT module. When the module has no chip fatigue failure and no bonding wire shedding failure, the degree of health is maximum. When the IGBT module is in a healthy initial state without chip fatigue failure, a gate-emitter voltage eigenvector is $\vec{x}$. When i chips fail in the IGBT module, a gate-emitter voltage eigenvector is $\vec{y}_i$. When the IGBT module is in the healthy initial state without bonding wire shedding failure, a transmission characteristic curve eigenvector of the IGBT module is $\vec{m}$. When p bonding wires shed in the IGBT module, a transmission characteristic curve eigenvector of the IGBT module is $\vec{n}_p$.

A chip health calculation module is used to obtain the linear correlation $PPMCC_C$ between the gate-emitter voltage in a chip fatigue failure state and a healthy state based on the gate-emitter voltage eigenvector $\vec{x}$ and the gate-emitter voltage eigenvector $\vec{y}_i$. The greater the $PPMCC_C$, the higher the correlation between the two, the higher the degree of health of chips, and the stronger the reliability.

A bonding wire health calculation module is used to obtain the linear correlation $PPMCC_B$ between the transmission characteristic curve in a bonding wire shedding failure state and the healthy state based on the transmission characteristic curve eigenvector $\vec{m}$ of the IGBT module and the transmission characteristic curve eigenvector $\vec{n}_p$ of the IGBT module. The greater the $PPMCC_B$, the greater the correlation between the two, the higher the degree of health of bonding wires, and the higher the reliability of the module.

In some optional implementations, the reliability evaluation module is used to perform a weighted summation on the linear correlation $PPMCC_C$ between the gate-emitter voltage in the chip fatigue failure state and the healthy state and the linear correlation $PPMCC_B$ between the transmission characteristic curve in the bonding wire shedding failure state and the healthy state to obtain an overall degree of health of the module, and evaluate the reliability of the multi-chip parallel IGBT module from the overall degree of health of the module. The overall degree of health of the module reflects the overall degree of health of the module in terms of a chip health state of the module and a bonding wire health state of the module.

According to another aspect of the disclosure, a computer-readable storage medium stored with a computer program is provided. When the computer program is executed by a processor, the steps of the method according to any one of the above are implemented.

Generally speaking, compared with the prior art, the above technical solutions conceived by the disclosure can achieve the following beneficial effects.

In the disclosure, the gate-emitter voltage reliability model of the multi-chip parallel IGBT module is established, the chip fatigue failure test is implemented, and the gate-emitter voltage is selected as the failure characteristic quantity; the transconductance reliability model of the multi-chip parallel IGBT module is established, the bonding wire shedding failure test is implemented, and the transmission characteristic curve of the module is selected as the failure characteristic quantity; the degree of health of the IGBT module is defined, the Pearson correlation coefficient is used to characterize the degree of health, and the degrees of health, that is $PPMCC_C$ and $PPMCC_B$, in different degrees of chip fatigue failure and bonding wire shedding failure states are respectively calculated; and the reliability of the multi-chip parallel IGBT module is comprehensively evaluated according to $PPMCC_C$ and $PPMCC_B$. The disclosure can implement the identification of the chip fatigue and bonding wire shedding failures in the multi-chip parallel IGBT module, can monitor the chip fatigue and bonding wire shedding failures in the IGBT module at the same time, has simple calculation and good comprehensive characteristics, and can implement the overall reliability evaluation of the multi-chip IGBT module.

DETAILED DESCRIPTION OF DISCLOSED EMBODIMENTS

In order for the objectives, technical solutions, and advantages of the disclosure to be clearer, the following further describes the disclosure in detail with reference to the accompanying drawings and embodiments. It should be understood that the specific embodiments described here are only used to explain the disclosure, but not to limit the disclosure. In addition, the technical features involved in the various embodiments of the disclosure described below may be combined with each other as long as there is no conflict therebetween.

In the example of the disclosure, "first", "second", etc. are used to distinguish different objects and are not necessarily used to describe a specific order or sequence.

Figure 1:
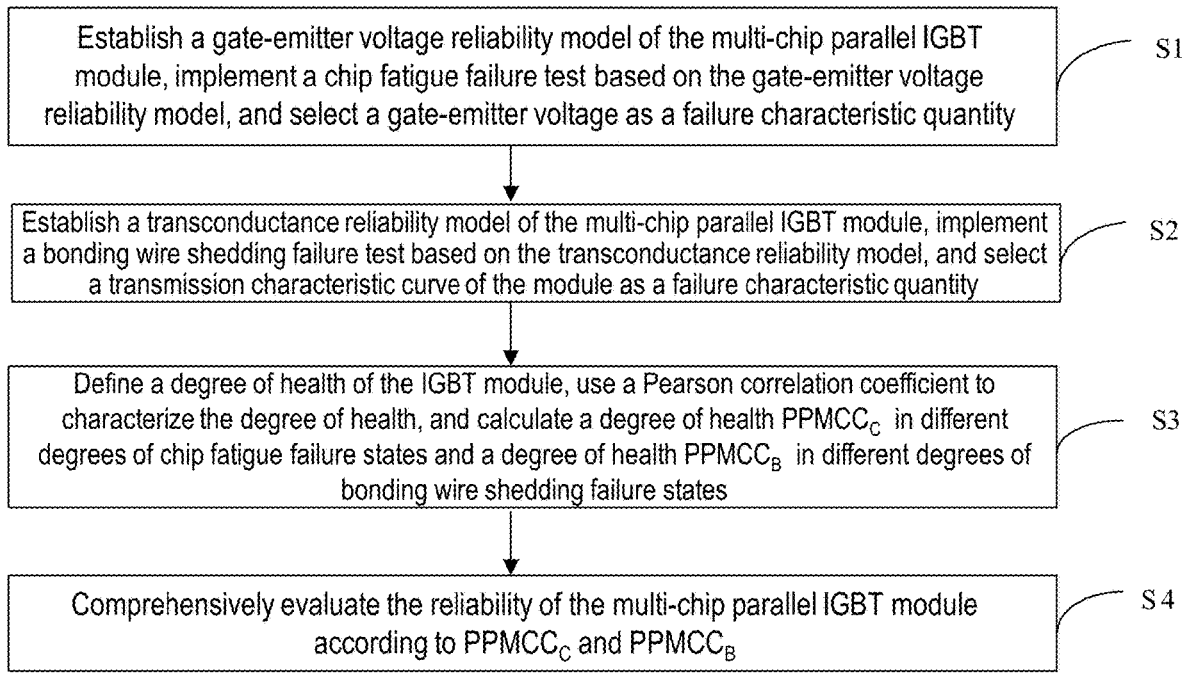
FIG. 1 is a schematic flowchart of a method for comprehensively evaluating reliability of a multi-chip parallel IGBT module according to an embodiment of the disclosure.

FIG. 1 shows a schematic flowchart of a method for comprehensively evaluating reliability of a multi-chip parallel IGBT module according to an embodiment of the disclosure, which implements the identification of chip fatigue and bonding wire shedding failures in the multi-chip parallel IGBT module to perform health state monitoring and reliability evaluation.

The method shown in FIG. 1 includes the following steps.

In Step S1, a gate-emitter voltage reliability model of the multi-chip parallel IGBT module is established, a chip fatigue failure test is implemented in a test circuit, and a gate-emitter voltage is selected as a failure characteristic quantity.

Further, Step S1 may be implemented as follows.

Figure 2:
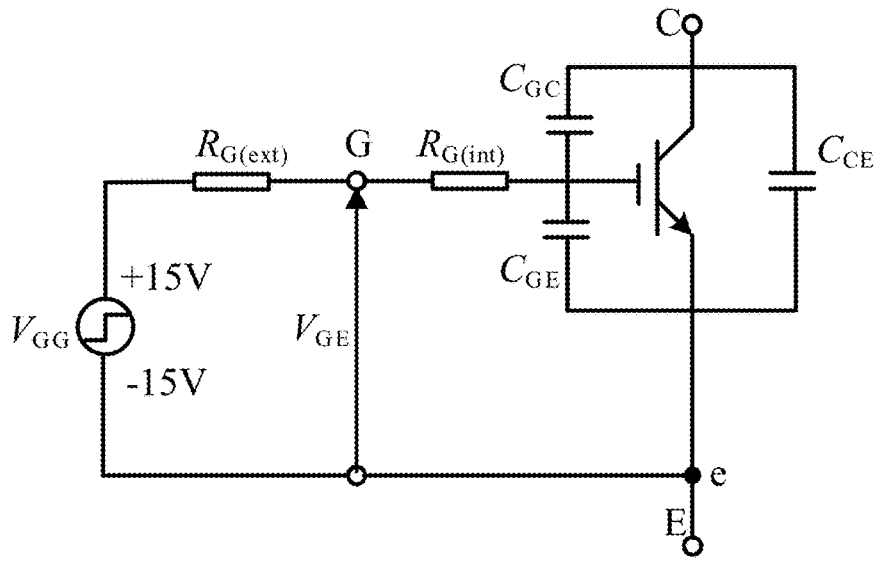
FIG. 2 is a gate-emitter equivalent resistor-capacitor (RC) circuit according to an embodiment of the disclosure.

A gate-emitter equivalent RC circuit in the embodiment of the disclosure is shown in FIG. 2. According to the gate-emitter equivalent RC circuit, during a turn-on process, a rising process of a gate voltage $V_{GE}$ is:

$$V_{GE}(t) = (V_{GG(ON)} - V_{GG(OFF)})\left(1 - e^{-\left[\frac{t}{R_G C_{ies}}\right]}\right) + V_{GG(OFF)}$$

where t is time; $R_G$ is a total gate resistance, $R_G = R_{G(int)} + R_{G(ext)}$, $R_{G(int)}$ is an internal gate resistance, and $R_{G(ext)}$ is an external gate resistance; $C_{ies}$ is a total gate input capacitance, $C_{ies} = C_{GE} + C_{GC}$, $V_{GG(ON)}$ represents a turn-on voltage of a gate drive power supply, $V_{GG(OFF)}$ represents a turn-off voltage of the gate drive power supply, $C_{GE}$ represents a gate-emitter capacitance, and $C_{GC}$ represents a gate-collector capacitance.

Figure 3:
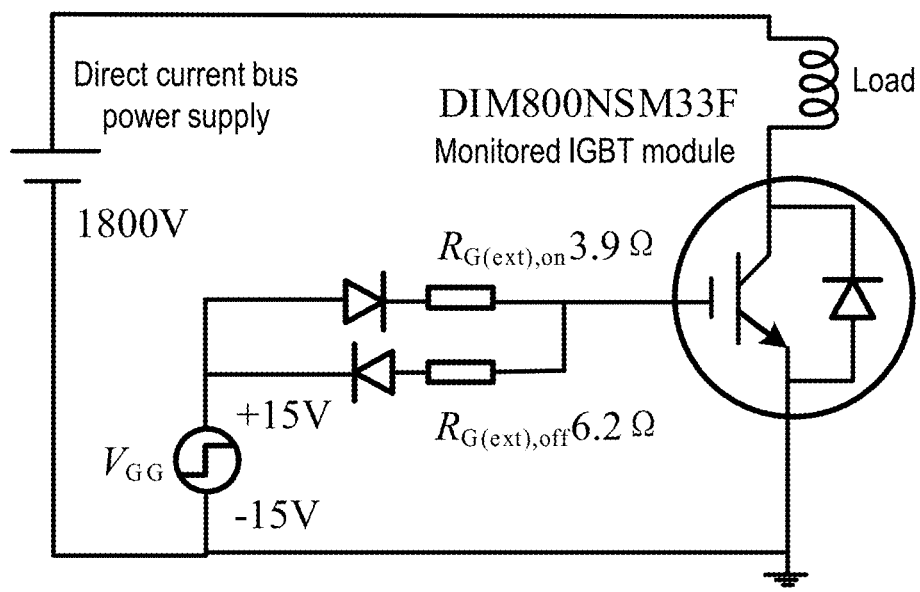
FIG. 3 is a principle diagram of a test circuit according to an embodiment of the disclosure.
Figure 4:
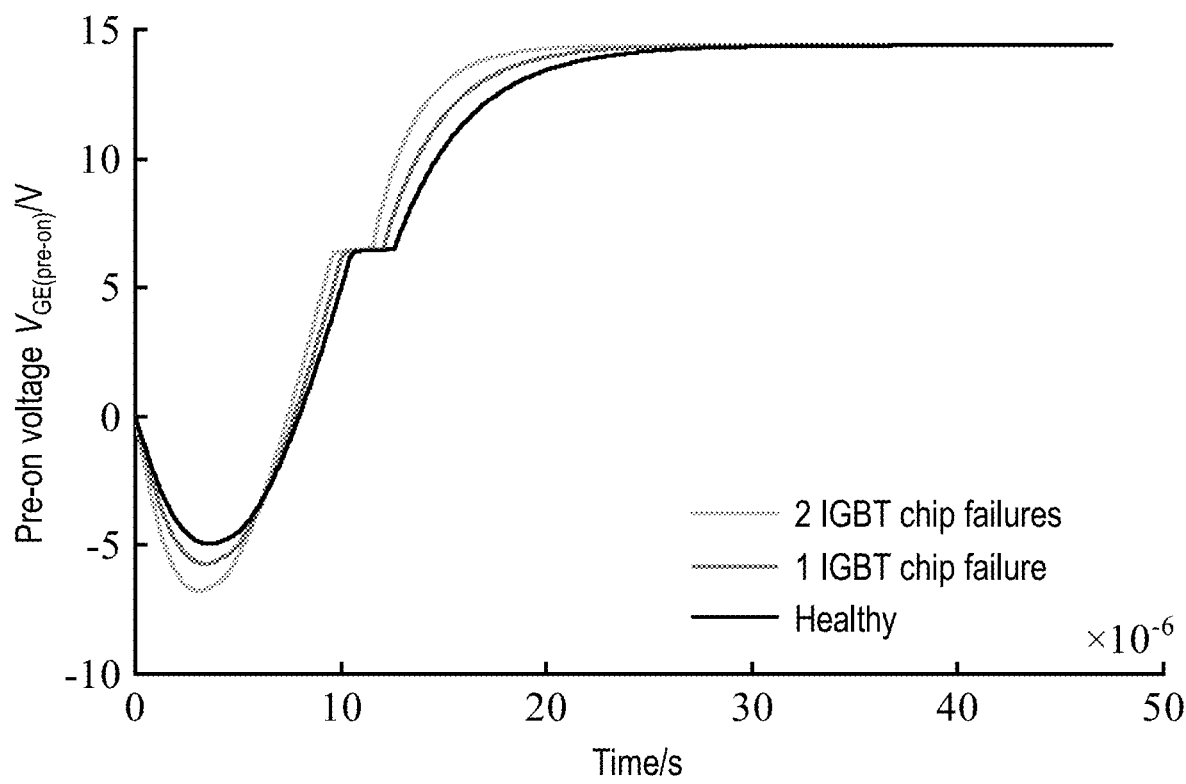
FIG. 4 is a gate voltage $V_{GE}$ under different chip failures according to an embodiment of the disclosure.

A principle diagram of a test circuit is shown in FIG. 3. A direct current bus power supply voltage of the test circuit is 1800 V, and a load is an inductive load of 400 μH. When a chip of the IGBT module fails, the total gate input capacitance $C_{ies}$ of the IGBT module decreases, and a total internal gate resistance $R_{G(int),total}$ of the IGBT module increases, and a trajectory of $V_{GE}$ changes. In the test circuit, the gate voltage $V_{GE}$ under different chip failures is measured as the characteristic quantity of chip failure monitoring. Taking a DIM800NSM33-F IGBT module as an example, the chip fatigue failure test is performed on the states of "healthy", "1 chip failure", and "2 chip failures". FIG. 4 shows the gate-emitter voltage $V_{GE}$ under different chip failures.

In Step S2, a transconductance reliability model of the multi-chip parallel IGBT module is established, a bonding wire shedding failure test is implemented in a test circuit, and a transmission characteristic curve of the module is selected as a failure characteristic quantity.

Further, Step S2 may be implemented as follows.

A horizontal axis of the transmission characteristic curve of the IGBT module is a gate-emitter voltage $u_{GE}$, and a vertical axis is a collector current $i_c$. According to the working principle of the IGBT chip, when the IGBT chip works in an active area, a control equation of the collector current $i_c$ is:

$$i \frac{\mu_{ni} C_{OX} Z}{2L(1 - \alpha_{pnp})_{GE_{GE(th)}}{}^2 GE_{GE(th)}{}^2{}_c}$$

where $\mu_{ni}$ is an electron migration speed, $C_{OX}$ is an oxide layer capacitance, Z and L are a length and a width of an internal gate-emitter of a metal-oxide-semiconductor fieldeffect transistor (MOSFET), $\alpha_{pnp}$ is a current gain of a PNP transistor, $U_{GE(th)}$ is a threshold voltage of the IGBT chip, and the above parameters are all determined by the structure and the material of the chip.

When the rate of change of the collector current $i_c$ and a gate current $i_G$ is relatively small, the parasitic resistance and all parasitic inductances may be ignored, and $u_G$ may be approximated as:

$$u_{GE}=u_i-i_cR_w$$

where $u_i$ is a gate drive voltage of the IGBT module, and a parameter $R_w$ is a bonding wire equivalent resistance.

When a bonding wire in the IGBT module sheds, the bonding wire equivalent resistance $R_w$ increases, thereby causing the transmission characteristic curve of the module to change.

Figure 5:
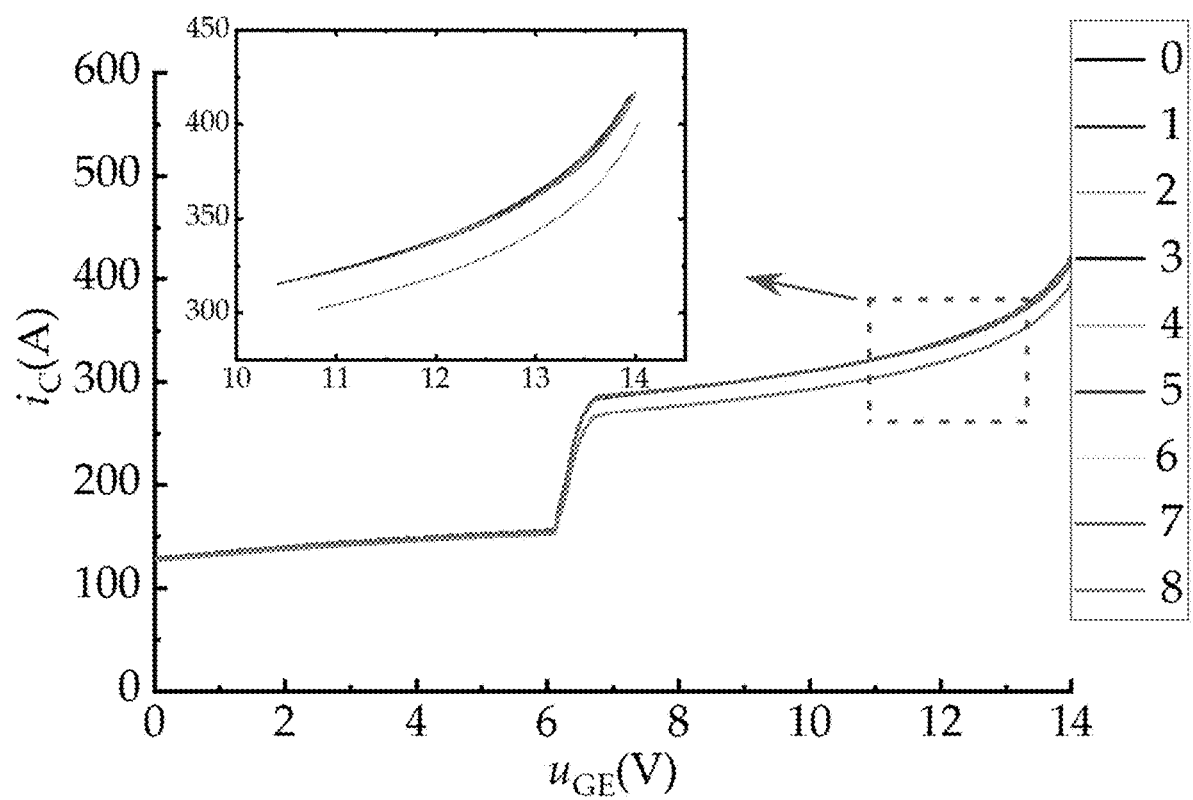
FIG. 5 is a transmission characteristic curve $u_{GE}$-$i_C$ under different bonding wire failures according to an embodiment of the disclosure.

The transmission characteristic curve obtained according to the test circuit measuring the collector current and the gate-emitter voltage is used as the characteristic quantity of bonding wire failure monitoring. Taking a DIM800NSM33-F IGBT module as an example, there are 8 bonding wires on one chip of the module, and a bonding wire state is that i (where i=0, 1, 2, . . . , 8) bonding wires shed. FIG. 5 shows the transmission characteristic curve of the IGBT module in different bonding wire failure states in the test circuit.

In Step S3, a degree of health of the IGBT module is defined, a Pearson correlation coefficient is used to characterize the degree of health, and the degrees of health, that is PPMCC$_C$ and PPMCC$_B$, in different degrees of chip fatigue failure and bonding wire shedding failure states are respectively calculated.

The degree of health of the IGBT module in a healthy state may be defined as 1, that is, PPMCC$_H$=1.

Further, Step S3 may be implemented as follows.

In Step S3.1, the reliability of the IGBT module is characterized by the degree of health. The greater the degree of health, the higher the reliability of the module. When the module has no chip fatigue failure and no bonding wire shedding failure, the degree of health is maximum, and the value may be set to 1. When the IGBT module is in a healthy initial state without chip fatigue failure, a gate-emitter voltage eigenvector is $\vec{x}$. When i chips fail in the module, an eigenvector is $\vec{y}_i$. A Pearson correlation coefficient PPMCC$_C$ may reflect a linear correlation between the gate-emitter voltage in the chip fatigue failure state and the healthy state of the module. The greater the PPMCC$_C$, the higher the correlation between the two, the higher the degree of health of chips, and the stronger the reliability. When the IGBT module is in the healthy initial state without bonding wire shedding failure, a transmission characteristic curve eigenvector of the module is $\vec{m}$. When p bonding wires fail in the module, an eigenvector is $\vec{n}_p$. A Pearson correlation coefficient PPMCC$_B$ may reflect a linear correlation between the transmission characteristic curve in the bonding wire shedding failure state and the healthy state. The greater the PPMCC$_B$, the greater the correlation between the two, the higher the degree of health of bonding wires, and the more reliable the module.

In Step S3.2, PPMCC$_C$ is used to characterize the degree of health of the module affected by the chip fatigue failure. With reference to the initial health state, the Pearson correlation coefficient is used to characterize the degree of health, that is, PPMCC$_C$=1. The degree of health of the module when there is the chip fatigue failure in the module is expressed by PPMCC$_C$, and the calculation method is:

$$PPMCC_c = r(\vec{x},\vec{y_i}) = \frac{\sum_{j=1}^{h}(x_j-\bar{x})(y_{ij}-\bar{y}_i)}{\sqrt{\sum_{j=1}^{h}(x_j-\bar{x})^2}\sqrt{\sum_{j=1}^{h}(y_{ij}-\bar{y}_i)^2}}$$

where h represents a number of selected samples, $x_j$ represents an observed value of a point j corresponding to the gate-emitter voltage eigenvector $\vec{x}$ without chip failure, $\bar{x}$ represents a mean of observed values of the eigenvector $\vec{x}$, $y_{ij}$ represents an observed value of the point j corresponding to the gate-emitter voltage eigenvector $\vec{y}_i$ when i chips fail, and $\bar{y}_i$ represents a mean of observed values of the eigenvector $\vec{y}_i$.

PPMCC$_C$ is calculated according to the above method according to the gate voltage $V_{GE}$ under different chip fatigue failures obtained in the test, and the calculation result is shown in Table 1.

TABLE 1

| PPMCC$_C$ in different chip fatigue failure states ||
| --- | --- |
| Number of IGBT chip failures | PPMCC$_C$ |
| 0 | 1 |
| 1 | 0.952 |
| 2 | 0.917 |

The PPMCC$_B$ is used to characterize the degree of health of the module affected by the bonding wire shedding failure. With reference to the initial health state, the Pearson correlation coefficient is used to characterize the degree of health, that is, PPMCC$_B$=1. The degree of health of the module when there is the bonding wire failure in the module is expressed by PPMCC$_B$, and the calculation method is:

$$PPMCC_B = r(\vec{m},\vec{n_p}) = \frac{\sum_{q=1}^{l}(m_q-\bar{m})(n_{pq}-\bar{n}_p)}{\sqrt{\sum_{q=1}^{l}(m_p-\bar{m})^2}\sqrt{\sum_{q=1}^{l}(n_{pq}-\bar{n}_p)^2}}$$

where l represents a number of selected samples, $m_q$ represents an observed value of a point q corresponding to the transmission characteristic curve eigenvector $\vec{m}$ of the module without bonding wire shedding, $\bar{m}$ represents a mean of observed values of the eigenvector $\vec{m}$, $n_{pq}$ represents an observed value of the point q corresponding to the transmission characteristic curve eigenvector $\vec{n}_p$ of the module when p bonding wires shed, and $\bar{n}_p$ represents a mean of observed values of the eigenvector $\vec{n}_p$.

The PPMCC$_B$ is calculated according to the above method according to the transmission characteristic curve under different bonding wire failures obtained in the test, and the calculation result is shown in Table 2.

TABLE 2

| PPMCC$_B$ in different bonding wire shedding failure states ||
| --- | --- |
| Number of IGBT bonding wire failures | Gate current PPMCC$_B$ |
| 0 | 1 |
| 1 | 0.993 |

TABLE 2-continued

PPMCC$_B$ in different bonding wire shedding failure states

| Number of IGBT bonding wire failures | Gate current PPMCC$_B$ |
|---|---|
| 2 | 0.984 |
| 3 | 0.976 |
| 4 | 0.965 |
| 5 | 0.957 |
| 6 | 0.948 |
| 7 | 0.940 |
| 8 | 0.925 |

In Step S4, the reliability of the multi-chip parallel IGBT module is comprehensively evaluated according to PPMCC$_C$ and PPMCC$_B$.

Further, Step S4 may be implemented as follows.

In Step S4.1, PPMCC$_H$ is defined as an overall degree of health of the module. The overall degree of health of the module may reflect a chip health state of the module and a bonding wire health state of the module. The overall degree of health of the module PPMCC$_H$ is related to the degree of health of chips PPMCC$_C$ and the degree of health of bonding wires PPMCC$_B$, that is, PPMCC$_H$=f(PPMCC$_C$, PPMCC$_B$). When there is no chip fatigue failure and no bonding wire shedding failure in the IGBT module, the overall degree of health of the module is defined as 1, that is, PPMCC$_H$=1.

In Step S4.2, 20% of module failures in the IGBT module are caused by the chip fatigue failure, and 80% of module failures are caused by the bonding wire shedding failure. The overall degree of health of the module is jointly measured by the degree of health of the module PPMCC$_C$ affected by the chip fatigue failure of the module and the degree of health of the module PPMCC$_B$ affected by the bonding wire shedding failure. The calculation method of the module reliability comprehensive indicator PPMCC$_H$ is:

$$PPMCC_H=0.2*PPMCC_C+0.8*PPMCC_B$$

The module reliability comprehensive indicator PPMCC$_H$ is affected by the chip health state and the bonding wire health state of the module at the same time, which can more comprehensively reflect the overall degree of health of the module. When the module is in a completely healthy state, that is, there is no chip fatigue failure and no bonding wire shedding failure, the module reliability comprehensive indicator is PPMCC$_H$=1. With the aging of the module and the occurrence of the chip fatigue and bonding wire shedding failures, the module reliability comprehensive indicator PPMCC$_H$ gradually decreases, and the reliability of the module gradually decreases. Therefore, the reliability of the module may be comprehensively evaluated through the module reliability comprehensive indicator PPMCC$_H$. The greater the PPMCC$_H$, the higher the reliability of the module.

The disclosure also provides a system for comprehensively evaluating reliability of a multi-chip parallel IGBT module, which includes the following.

A first failure characteristic quantity acquisition module is used to establish a gate-emitter voltage reliability model of the multi-chip parallel IGBT module, implement a chip fatigue failure test based on the gate-emitter voltage reliability model, and select a gate-emitter voltage as a failure characteristic quantity.

A second failure characteristic quantity acquisition module is used to establish a transconductance reliability model of the multi-chip parallel IGBT module, implement a bonding wire shedding failure test based on the transconductance reliability model, and select a transmission characteristic curve of the module as a failure characteristic quantity.

A health degree calculation module is used to define a degree of health of the IGBT module, use a Pearson correlation coefficient to characterize the degree of health, and calculate a degree of health PPMCC$_C$ in different degrees of chip fatigue failure states and a degree of health PPMCC$_B$ in different degrees of bonding wire shedding failure states.

A reliability evaluation module is used to comprehensively evaluate the reliability of the multi-chip parallel IGBT module according to PPMCC$_C$ and PPMCC$_B$.

Further, the health degree calculation module includes the following.

A health parameter definition module is used to adopt the degree of health to characterize the reliability of the IGBT module. When the module has no chip fatigue failure and no bonding wire shedding failure, the degree of health is maximum. When the IGBT module is in a healthy initial state without chip fatigue failure, a gate-emitter voltage eigenvector is $\vec{x}$. When i chips fail in the IGBT module, a gate-emitter voltage eigenvector is $\vec{y}_i$. When the IGBT module is in the healthy initial state without bonding wire shedding failure, a transmission characteristic curve eigenvector of the IGBT module is $\vec{m}$. When p bonding wires shed in the IGBT module, a transmission characteristic curve eigenvector of the IGBT module is $\vec{n}_p$.

A chip health calculation module is used to obtain the linear correlation PPMCC$_C$ between the gate-emitter voltage in a chip fatigue failure state and a healthy state based on the gate-emitter voltage eigenvector x and the gate-emitter voltage eigenvector $\vec{y}_i$. The greater the PPMCC$_C$, the higher the correlation between the two, the higher the degree of health of chips, and the stronger the reliability.

A bonding wire health calculation module is used to obtain the linear correlation PPMCC$_B$ between the transmission characteristic curve in a bonding wire shedding failure state and the healthy state based on the transmission characteristic curve eigenvector $\vec{m}$ of the IGBT module and the transmission characteristic curve eigenvector $\vec{n}_p$ of the IGBT module. The greater the PPMCC$_B$, the greater the correlation between the two, the higher the degree of health of bonding wires, and the higher the reliability of the module.

Further, the reliability evaluation module is used to perform a weighted summation on the linear correlation PPMCC$_C$ between the gate-emitter voltage in the chip fatigue failure state and the healthy state and the linear correlation PPMCC$_B$ between the transmission characteristic curve in the bonding wire shedding failure state and the healthy state to obtain an overall degree of health of the module, and evaluate the reliability of the multi-chip parallel IGBT module from the overall degree of health of the module. The overall degree of health of the module reflects the overall degree of health of the module in terms of a chip health state of the module and a bonding wire health state of the module.

For the specific implementation of each module, reference may be made to the description of the foregoing embodiment of the method, which will not be repeated in the embodiment of the disclosure.

It should be noted that according to implementation requirements, each step/component described in the disclosure may be split into more steps/components or two or more steps/components or partial operation of a step/component may be combined into a new step/component to implement the objective of the disclosure.

Persons skilled in the art may easily understand that the above are only preferred embodiments of the disclosure and are not intended to limit the disclosure. Any modification, equivalent replacement, improvement, etc., made within the spirit and principle of the disclosure should be included in the protection scope of the disclosure.

What is claimed is:

1. A method for comprehensively evaluating reliability of a multi-chip parallel insulated gate bipolar transistor (IGBT) module, comprising:
   Step (1) of establishing a gate-emitter voltage reliability model of the multi-chip parallel IGBT module, implementing a chip fatigue failure test based on the gate-emitter voltage reliability model, and selecting a gate-emitter voltage as a failure characteristic quantity;
   Step (2) of establishing a transconductance reliability model of the multi-chip parallel IGBT module, implementing a bonding wire shedding failure test based on the transconductance reliability model, and selecting a transmission characteristic curve of the module as a failure characteristic quantity;
   Step (3) of defining a degree of health of the IGBT module, using a Pearson correlation coefficient to characterize the degree of health, and calculating a linear correlation $PPMCC_C$ in different degrees of chip fatigue failure states and a linear correlation $PPMCC_B$ in different degrees of bonding wire shedding failure states; and
   Step (4) of comprehensively evaluating the reliability of the multi-chip parallel IGBT module according to $PPMCC_C$ and $PPMCC_B$.

2. The method for comprehensively evaluating the reliability of the multi-chip parallel IGBT module according to claim 1, wherein Step (3) specifically comprises:
   Step (3.1) of adopting the degree of health to characterize the reliability of the IGBT module, wherein when the module has no chip fatigue failure and no bonding wire shedding failure, the degree of health is maximum, when the IGBT module is in a healthy initial state without chip fatigue failure, a gate-emitter voltage eigenvector is $\vec{x}$, and when i chips fail in the IGBT module, a gate-emitter voltage eigenvector is $\vec{y}_i$; and when the IGBT module is in the healthy initial state without bonding wire shedding failure, a transmission characteristic curve eigenvector of the IGBT module is $\vec{m}$, and when p bonding wires shed in the IGBT module, a transmission characteristic curve eigenvector of the IGBT module is $\vec{n}_p$;
   Step (3.2) of obtaining the linear correlation $PPMCC_C$ between the gate-emitter voltage in a chip fatigue failure state and a healthy state based on the gate-emitter voltage eigenvector $\vec{x}$ and the gate-emitter voltage eigenvector $\vec{y}_i$, wherein the greater the $PPMCC_C$, the higher the correlation between the two, the higher the degree of health of chips, and the stronger the reliability; and
   Step (3.3) of obtaining the linear correlation $PPMCC_B$ between the transmission characteristic curve in a bonding wire shedding failure state and the healthy state based on the transmission characteristic curve eigenvector $\vec{m}$ of the IGBT module and the transmission characteristic curve eigenvector $\vec{n}_p$ of the IGBT module, wherein the greater the $PPMCC_B$, the greater the correlation between the two, the higher the degree of health of bonding wires, and the higher the reliability of the module.

3. The method for comprehensively evaluating the reliability of the multi-chip parallel IGBT module according to claim 2, wherein the linear correlation $PPMCC_C = r(\vec{x}, \vec{y}_i)$ between the gate-emitter voltage in the chip fatigue failure state and the healthy state is obtained from $$PPMCC_C = r(\vec{x}, \vec{y}_i) = \frac{\sum_{j=1}^{h}(x_j - \bar{x})(y_{ij} - \bar{y}_i)}{\sqrt{\sum_{j=1}^{h}(x_j - \bar{x})^2}\sqrt{\sum_{j=1}^{h}(y_{ij} - \bar{y}_i)^2}},$$

where h represents a number of selected samples, xj represents an observed value of a point j corresponding to the gate-emitter voltage eigenvector $\vec{x}$ without chip failure, $\bar{x}$ represents a mean of observed values of the eigenvector $\vec{x}$, yij represents an observed value of the point j corresponding to the gate-emitter voltage eigenvector $\vec{y}_i$ when i chips fail, and $\bar{y}_i$ represents a mean of observed values of the eigenvector $\vec{y}_i$.

4. The method for comprehensively evaluating the reliability of the multi-chip parallel IGBT module according to claim 3, wherein the linear correlation $PPMCC_B = r(\vec{m}, \vec{n}_p)$ between the transmission characteristic curve in the bonding wire shedding failure state and the healthy state is obtained from $$PPMCC_B = r(\vec{m}, \vec{n}_p) = \frac{\sum_{q=1}^{l}(m_q - \bar{m})(n_{pq} - \bar{n}_p)}{\sqrt{\sum_{q=1}^{l}(m_p - \bar{m})^2}\sqrt{\sum_{q=1}^{l}(n_{pq} - \bar{n}_p)^2}},$$

where l represents a number of selected samples, mq represents an observed value of a point q corresponding to the transmission characteristic curve eigenvector $\vec{m}$ of the module without bonding wire shedding, $\bar{m}$ represents a mean of observed values of the eigenvector $\vec{m}$, npq represents an observed value of the point q corresponding to the transmission characteristic curve eigenvector $\vec{n}_p$ of the module when p bonding wires shed, and $\bar{n}_p$ represents a mean of observed values of the eigenvector $\vec{n}_p$.

5. The method for comprehensively evaluating the reliability of the multi-chip parallel IGBT module according to claim 4, wherein Step (4) specifically comprises:
   performing a weighted summation on the linear correlation $PPMCC_C$ between the gate-emitter voltage in the chip fatigue failure state and the healthy state and the linear correlation $PPMCC_B$ between the transmission characteristic curve in the bonding wire shedding failure state and the healthy state to obtain an overall degree of health of the module, and evaluating the reliability of the multi-chip parallel IGBT module from the overall degree of health of the module, wherein the overall degree of health of the module reflects the overall degree of health of the module in terms of a chip health state of the module and a bonding wire health state of the module.

6. The method for comprehensively evaluating the reliability of the multi-chip parallel IGBT module according to claim 5, wherein the overall degree of health of the module is obtained from $PPMCC_H = a*PPMCC_C + b*PPMCC_B$, where a represents a proportion of failures caused by the chip fatigue failure in the IGBT module, and b represents a proportion of failures caused by the bonding wire shedding failure in the IGBT module.

7. A non-transitory computer-readable storage medium stored with a computer program, characterized in that when the computer program is executed by a processor, the steps of the method according to claim 6 are implemented.

8. A non-transitory computer-readable storage medium stored with a computer program, characterized in that when the computer program is executed by a processor, the steps of the method according to claim 5 are implemented.

9. A non-transitory computer-readable storage medium stored with a computer program, characterized in that when the computer program is executed by a processor, the steps of the method according to claim 4 are implemented.

10. A non-transitory computer-readable storage medium stored with a computer program, characterized in that when the computer program is executed by a processor, the steps of the method according to claim 3 are implemented.

11. A non-transitory computer-readable storage medium stored with a computer program, characterized in that when the computer program is executed by a processor, the steps of the method according to claim 2 are implemented.

12. A non-transitory computer-readable storage medium stored with a computer program, characterized in that when the computer program is executed by a processor, the steps of the method according to claim 1 are implemented.

13. A system for comprehensively evaluating reliability of a multi-chip parallel IGBT module, comprising:
- a first failure characteristic quantity acquisition module, used to establish a gate-emitter voltage reliability model of the multi-chip parallel IGBT module, implement a chip fatigue failure test based on the gate-emitter voltage reliability model, and select a gate-emitter voltage as a failure characteristic quantity;
- a second failure characteristic quantity acquisition module, used to establish a transconductance reliability model of the multi-chip parallel IGBT module, implement a bonding wire shedding failure test based on the transconductance reliability model, and select a transmission characteristic curve of the module as a failure characteristic quantity;
- a health degree calculation module, used to define a degree of health of the IGBT module, use a Pearson correlation coefficient to characterize the degree of health, and calculate a linear correlation $PPMCC_C$ in different degrees of chip fatigue failure states and a linear correlation $PPMCC_B$ in different degrees of bonding wire shedding failure states; and
- a reliability evaluation module, used to comprehensively evaluate the reliability of the multi-chip parallel IGBT module according to $PPMCC_C$ and $PPMCC_B$.

14. The system for comprehensively evaluating the reliability of the multi-chip parallel IGBT module according to claim 13, wherein the health degree calculation module comprises:
- a health parameter definition module, used to adopt the degree of health to characterize the reliability of the IGBT module, wherein when the module has no chip fatigue failure and no bonding wire shedding failure, the degree of health is maximum, when the IGBT module is in a healthy initial state without chip fatigue failure, a gate-emitter voltage eigenvector is $\vec{x}$, and when i chips fail in the IGBT module, a gate-emitter voltage eigenvector is $\vec{y}_i$; and when the IGBT module is in the healthy initial state without bonding wire shedding failure, a transmission characteristic curve eigenvector of the IGBT module is $\vec{m}$; and when p bonding wires shed in the IGBT module, a transmission characteristic curve eigenvector of the IGBT module is $\vec{np}$;
- a chip health calculation module, used to obtain the linear correlation $PPMCC_C$ between the gate-emitter voltage in a chip fatigue failure state and a healthy state based on the gate-emitter voltage eigenvector $\vec{x}$ and the gate-emitter voltage eigenvector $\vec{y}_i$, wherein the greater the $PPMCC_C$, the higher the correlation between the two, the higher the degree of health of chips, and the stronger the reliability; and
- a bonding wire health calculation module, used to obtain the linear correlation $PPMCC_B$ between the transmission characteristic curve in a bonding wire shedding failure state and the healthy state based on the transmission characteristic curve eigenvector $\vec{m}$ of the IGBT module and the transmission characteristic curve eigenvector $\vec{np}$ of the IGBT module, wherein the greater the $PPMCC_B$, the greater the correlation between the two, the higher the degree of health of bonding wires, and the higher the reliability of the module.

15. The system for comprehensively evaluating the reliability of the multi-chip parallel IGBT module according to claim 14, wherein the reliability evaluation module is used to perform a weighted summation on the linear correlation $PPMCC_C$ between the gate-emitter voltage in the chip fatigue failure state and the healthy state and the linear correlation $PPMCC_B$ between the transmission characteristic curve in the bonding wire shedding failure state and the healthy state to obtain an overall degree of health of the module, and evaluate the reliability of the multi-chip parallel IGBT module from the overall degree of health of the module, wherein the overall degree of health of the module reflects the overall degree of health of the module in terms of a chip health state of the module and a bonding wire health state of the module.

* * * * *